UNITED STATES PATENT OFFICE.

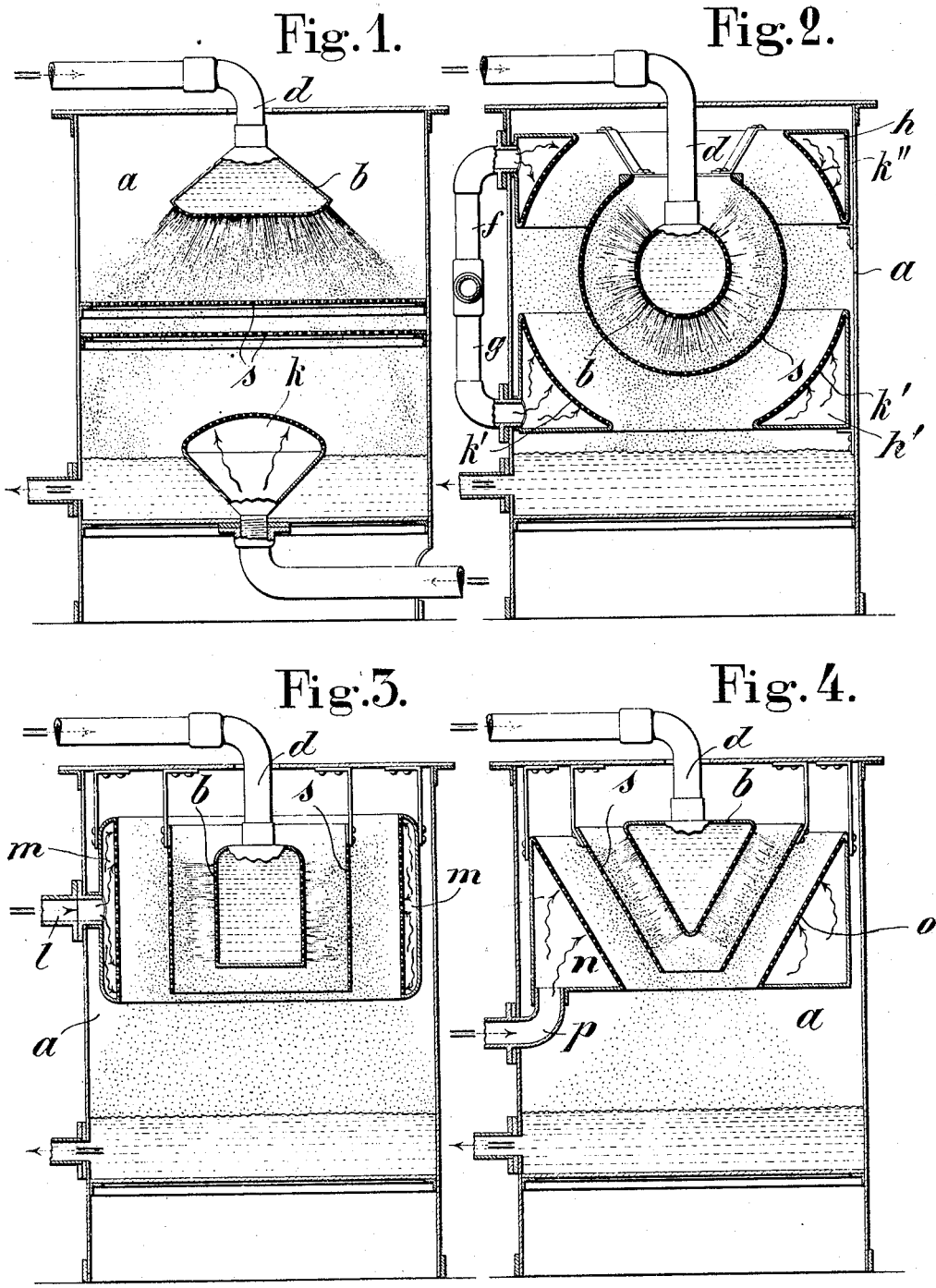

AUGUST HOLLE, OF DÜSSELDORF, GERMANY.

APPARATUS FOR WATER PURIFICATION.

No. 858,183.　　　　　Specification of Letters Patent.　　　　　Patented June 25, 1907.

Application filed October 20, 1906. Serial No. 339,737.

*To all whom it may concern:*

Be it known that I, AUGUST HOLLE, a citizen of Germany, residing at Düsseldorf, Germany, have invented new and useful Improvements in Apparatus for Water Purification, of which the following is a specification.

My invention relates to an apparatus for the oxidation of fluid, the removal of the precipitate obtained thereby and more particularly the elimination of ferruginous matter contained in such fluid, and the object of my invention is to provide an apparatus of the kind referred to in which there are contained densely perforated sprayer-like hollow bodies facing suitable screens, the fluid being by suitable pressure forced through the said perforations, converted thereby into a spray, part of which rebounds from the screen while another part passes the latter being atomized to a fine mist, and, further, to provide for the conduction of air or oxygen against the atomized fluid, causing a close mixture of the gas with the atomic particles of the fluid to accomplish a perfect oxidation of any oxidable matter contained in such fluid.

The apparatus is more particularly designed for the purification of water, such as well water, river water and sea water, by oxidizing the iron salts or other salts usually contained therein. As the oxids thus produced are insoluble in water, they may be readily filtered off, and a pure and clean filtrate thus be obtained.

The drawing herewith shows several forms of my apparatus in four vertical sections, each illustrating a different arrangement of the afore-mentioned sprayer and screen as well as a different disposal of the admission conduits of the air or oxygen, the description of each figure appearing below.

In a tank $a$ there is provided a sprayer $b$ provided with densely disposed, fine perforations, and a screen $s$ in face of the said perforations. The said sprayer is secured to the orifice of a vertically entering feed pipe $d$ through which the fluid intended for treatment may be forced in, preferably under pneumatic or other suitable pressure. The said sprayer may be given any suitable form, the said screen being shaped to correspond with the shape of the sprayer in such way that the fluid forced into the sprayer is directed against the screen in an approximate right angle.

In the drawing herewith the form illustrated in Figure 1 shows a sprayer in the shape of a rose-head and the screen $s$ is at some distance placed horizontally beneath the former as a flat disk; in Fig. 2 the said sprayer is of spherical shape, provided with fine perforations on the whole surface and accordingly the screen $s$ is a corresponding spherical mantle of correspontlingly larger diameter inclosing the said ball sprayer concentrically so that the fluid forced radially through the sprayer meets all around the perforated wall of the mantle; in Fig. 3 the sprayer is cylindric and so is the screen $s$ around it; and in Fig. 4 the sprayer is a cone surrounded by another conical structure of correspondingly larger size.

The orifices for the admission of air or oxygen or atmospheric air to which additional oxygen has been mixed may be disposed in any suitable place or places. I prefer the arrangement shown in Fig. 1 where the gas admitting pipe is in the bottom of the tank there being mounted on and secured to the orifice a rose-head $k$ similar to that of the sprayer afore-mentioned through which the gas may be blown so as to move against and into the aforesaid mist. The gas may, however, be admitted direct through an orifice or orifices in the side of the tank in which case it is preferable to place another perforated device or screen between such orifice and the screen $s$, as shown in Figs. 2, 3, 4. In Fig. 2 there are shown a pair of pipe arms $f$, $g$, one entering above, the other beneath the centerline of the spherical screen $s$ into an annular compartment $h$, $h'$ with a perforated wall $k''$, $k'$ arched concentric with the spherical bodies $b$ and $s$ and embracing the latter at some distance. In Fig. 3 the oxygen or air is blown through an orifice $l$ in the side of the tank opening into a perforated cylinder $m$ inclosing the cylinder $s$. In Fig. 4 the air or oxygen is admitted beneath the conic screen $s$ through an elbow $p$ into an annular compartment $n$ with a perforated wall $o$ corresponding and concentric with the conical screen $s$.

The best way of using the apparatus is as above indicated. The fluid intended to be operated upon may be forced under pressure into the sprayer $b$ from which it radiates in fine jets against the screen s being in passing the same further atomized forming a mist; the air, preferably mixed with additional oxygen, is blown in and mixes with the mist, thereby coming in close touch with the said atomic particles, the result being a perfect oxidation of any oxidable substance and elimination of ferruginous matter.

A partial oxidation may be accomplished by forcing the fluid through by means of pneumatic pressure, the air forced in doing already a good deal of oxidizing work.

The invention may be employed, for example, for the oxidation of iron compounds contained in water. These compounds are generally dissolved in water in the form of iron - protoxid - bicarbonates, and are changed by the oxidation into iron-protoxid-oxids. The latter being insoluble in water, may be readily filtered off, such removal of the iron being frequently necessary before the water can be utilized in the arts.

What I claim as my invention and desire to protect by Letters Patent is:

1. An apparatus of the kind referred to comprising the combination of a tank, a hollow body provided with densely disposed, fine perforations, a fluid supply pipe opening into the said perforated body, a screen placed in face of the perforations of the said body in such way that the fluid forced in through the said supply-pipe is thrown against it at an approximate right angle, and admission orifices adapted to conduct any air blown therethrough against the said screen, substantially as described.

2. In an apparatus of the kind referred to a rose-head provided with densely disposed, fine perforations secured to and vertically suspended from the end of a fluid supply pipe, and a horizontal screen beneath the said rose-head and facing the perforations therein, substantially as described.

3. In an apparatus of the kind referred to the combination of a rose-head provided with densely disposed, fine perforations secured to and vertically suspended from the end of a fluid supply pipe, a horizontal screen beneath the said rose-head and facing the perforations therein, and another rose-head in the bottom of the apparatus, secured to the end of a gas supply pipe, the said second rose head facing the said screen, substantially as described.

4. In a device of the character described, a screen, combined with a liquid sprayer, and an opposed gas discharge nozzle arranged at opposite sides of the screen, substantially as specified.

In testimony whereof I have signed my name to this specification in the presence of two subscribing witnesses.

AUGUST HOLLE.

Witnesses:
 ALFRED POHLMEYER,
 M. ENGELS.